United States Patent
Wang et al.

(10) Patent No.: US 12,513,437 B2
(45) Date of Patent: Dec. 30, 2025

(54) DATA TRANSMISSION METHOD, APPARATUS, AND SYSTEM

(71) Applicant: Huawei Technologies Co., Ltd., Shenzhen (CN)

(72) Inventors: Yiming Wang, Dongguan (CN); Wenming Wang, Wuhan (CN); Yong Luo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/496,217

(22) Filed: Oct. 27, 2023

(65) Prior Publication Data
US 2024/0056703 A1 Feb. 15, 2024

Related U.S. Application Data

(63) Continuation of application No. PCT/CN2022/089078, filed on Apr. 25, 2022.

(30) Foreign Application Priority Data

Apr. 30, 2021 (CN) .......................... 202110482493.7

(51) Int. Cl.
H04Q 11/00 (2006.01)
(52) U.S. Cl.
CPC ................. *H04Q 11/0003* (2013.01)
(58) Field of Classification Search
CPC .................................................... H04Q 11/00
See application file for complete search history.

(56) References Cited

U.S. PATENT DOCUMENTS

| 11,916,803 | B2 * | 2/2024 | Chi et al. .............. H04L 47/621 |
| 2020/0136855 | A1 * | 4/2020 | McBride et al. ... H04L 12/2876 |
| 2021/0266234 | A1 * | 8/2021 | Barnett, Jr. et al. ........................ H04L 41/5006 |

OTHER PUBLICATIONS

TR-157: Component Objects for CWMP, Broadband Forum, Issue Date: Nov. 2022, total 7 pages.
TR-181: Device Data Model for CWMP Endpoints and USP Agents, Broadband Forum, Sep. 2024, total 210 pages.

* cited by examiner

*Primary Examiner* — Kenneth N Vanderpuye
(74) *Attorney, Agent, or Firm* — Conley Rose, P.C.

(57) ABSTRACT

A data transmission method includes an optical network terminal (ONT) that receives a first data packet. The ONT matches first information about the first data packet with a locally or remotely stored first information base, where a service corresponding to the first information in the first information base is in a preconfigured service set. When the first information base does not include the first information about the first data packet, the ONT sends, through a first path, the first data packet to a first server corresponding to a first service, and when the ONT determines that the first service is in the preconfigured service set, the ONT adds the first information about the first data packet to the first information base.

20 Claims, 6 Drawing Sheets

DATA TRANSMISSION METHOD, APPARATUS, AND SYSTEM

CROSS-REFERENCE TO RELATED APPLICATIONS

This is a continuation of International Patent Application No. PCT/CN2022/089078 filed on Apr. 25, 2022, which claims priority to Chinese Patent Application No. 202110482493.7 filed on Apr. 30, 2021. The disclosures of the aforementioned applications are hereby incorporated by reference in their entireties.

TECHNICAL FIELD

This application relates to the field of communication technologies, and in particular, to a data transmission method, an apparatus, and a system.

BACKGROUND

As shown in FIG. 1, a broadband access structure defined in a conventional technology is mainly divided into three parts: a residential gateway (RG), an access network, and a broadband network.

However, an existing broadband access structure faces the following problems during data transmission.

Different from a conventional triple-play service, some newly emerging services, for example, various application services (over the top (OTT)) provided by the Internet for users, such as service cloudification, home office, cross-border education, a cross-border game, and international shopping, need a carrier to ensure network quality to some extent. However, in an existing broadband access architecture, all Internet services (including the triple-play service and the OTT service) are transmitted in a same Internet service flow in a mixed manner, and share a transmission path and bandwidth. Consequently, the OTT service has no service-level agreement (SLA) assurance. The SLA assurance herein may be understood as a network quality assurance provided by the carrier.

Therefore, how to provide the SLA assurance for the newly emerging service is an urgent problem to be resolved currently.

SUMMARY

Embodiments of this application provide a data transmission method, an apparatus, and a system, to resolve a problem that an existing broadband access structure cannot provide an SLA assurance for a newly emerging service.

To achieve the foregoing objective, the following technical solutions are used in embodiments of this application.

According to a first aspect, a data transmission method is provided. The method includes an optical network terminal (ONT) that receives a first data packet. The ONT matches first information about the first data packet with a locally or remotely stored first information base, where a service corresponding to the first information in the first information base is in a preconfigured service set. When the first information base does not include the first information about the first data packet, the ONT sends, through a first path, the first data packet to a first server corresponding to a first service, and when the first service is in the preconfigured service set, the ONT adds the first information about the first data packet to the first information base, where the first service is a service corresponding to the first data packet. When the first information base includes the first information about the first data packet, the ONT sends the first data packet to the first server through a second path. Based on the data transmission method provided in this embodiment of this application, when the first information base does not include the first information about the first data packet, if the first service is in the preconfigured service set, the ONT adds the first information about the first data packet to the first information base. Therefore, when the ONT subsequently receives a data packet that has the same first information as the first data packet, the data packet may be transmitted to a server through the second path. In other words, for a service in the preconfigured service set, a non-first packet or a first packet whose first information is already in the first information base before the first packet is received may be transmitted through the second path. It may be understood that if the first service is not in the preconfigured service set, the ONT does not add the first information about the first data packet to the first information base. Therefore, for a service that is not in the preconfigured service set, first information about a data packet is not in the first information base, and data of the service that is not in the preconfigured service set is transmitted through the first path. Therefore, in comparison with an existing solution in which data of all services is transmitted in a mixed manner, in this solution, data of a service in a service set and data of a service outside the service set can be separately transmitted, to provide an SLA assurance for a newly emerging service.

With reference to the first aspect, in a possible implementation, that the ONT determines that the first service corresponding to the first data packet is in the preconfigured service set includes that the ONT determines, based on second information about the first data packet, that the first service corresponding to the first data packet is in the preconfigured service set, where the second information reflects the first service corresponding to the first data packet. Based on this solution, the ONT may identify, based on the second information about the data packet, the first service corresponding to the first data packet, and determine whether the first service corresponding to the first data packet is in the preconfigured service set.

With reference to the first aspect, in a possible implementation, before that the ONT sends the first data packet to the first server through a second path, the method further includes that the ONT determines that the service corresponding to the first data packet is the first service. The ONT determines the second path based on a correspondence between identification information of the first service and identification information of the second path. Because the second path in this solution is in a service granularity, path division based on the service granularity may be implemented during service data transmission, to further ensure an SLA for a service.

With reference to the first aspect, in a possible implementation, the correspondence between the identification information of the first service and the identification information of the second path is stored in the ONT, or the correspondence between the identification information of the first service and the identification information of the second path is stored in a cloud management platform connected to the ONT. Based on this solution, two storage manners of the correspondence between the identification information of the first service and the identification information of the second path are provided. An appropriate storage manner may be selected based on an actual requirement.

With reference to the first aspect, in a possible implementation, before that the ONT sends the first data packet to the first server through a second path, the method further includes that the ONT determines the second path based on the first information about the first data packet and a correspondence between the first information about the first data packet and identification information of the second path. Based on this solution, when one service uniquely corresponds to first information about one data packet, path division based on a service granularity may be implemented. When one service may correspond to first information about a plurality of data packets, path division based on a granularity less than the service granularity may be implemented. Therefore, based on this solution, an SLA ASSURANCE for a service can be further ensured.

With reference to the first aspect, in a possible implementation, the correspondence between the first information about the first data packet and the identification information of the second path is stored in the ONT, or the correspondence between the first information about the first data packet and the identification information of the second path is stored in a cloud management platform connected to the ONT. Based on this solution, two storage manners of the correspondence between the first information about the first data packet and the identification information of the second path are provided. An appropriate storage manner may be selected based on an actual requirement.

With reference to the first aspect, in a possible implementation, the first information base is locally stored in the ONT, and before that an ONT receives a first data packet, the method further includes that the ONT receives the first information about the first data packet from the cloud management platform. The ONT stores the first information about the first data packet in the first information base. Based on this solution, first information in first information bases of all ONTs connected to the cloud management platform may be synchronously updated via the cloud management platform. Further, when an ONT receives a first packet of a service in the preconfigured service set but first information about the first packet is not stored in the first information base before, through synchronous update via the cloud management platform, if a remaining ONT subsequently receives a data packet of the service, the data packet may be directly transmitted through the second path. This saves time and resources for the remaining ONT to identify a data packet service.

With reference to the first aspect, in a possible implementation, the first information about the first data packet includes an Internet Protocol (IP) address, 5-tuple information, or service traffic characteristic information of the first data packet. Based on this solution, a plurality types of first information are provided, and appropriate first information may be selected based on an actual requirement to configure the first information base.

With reference to the first aspect, in a possible implementation, the second path is an overlay network tunnel. Based on this solution, when a data packet is transmitted, the data packet may be directly transmitted from a start point of the overlay network tunnel to an end point of the overlay network tunnel, and then transmitted from the end point of the tunnel to the first server, so that point-to-point communication can be implemented without considering distribution of physical network devices of a physical underlay network. Therefore, compared with an existing solution in which transmission is performed based on the physical underlay network, this solution can ensure end-to-end service quality.

With reference to the first aspect, in a possible implementation, the first information base is locally stored in the ONT, or the first information base is remotely stored in the cloud management platform connected to the ONT. Based on this solution, two storage manners of the first information base are provided, and an appropriate storage manner may be selected based on an actual requirement.

With reference to the first aspect, in a possible implementation, the service set includes a value-added service or various application services provided by the Internet for users OTT service. Based on this solution, the value-added service or the OTT service may be transmitted separately from another service to ensure an SLA assurance for the value-added service or the OTT service.

According to a second aspect, an ONT is provided to implement the foregoing method. The ONT has a function of implementing the method according to the first aspect. The function may be implemented by hardware, or may be implemented by hardware executing corresponding software. The hardware or the software includes one or more modules corresponding to the foregoing function. For example, an optical network unit (ONU) may include a transceiver module and a processing module. The transceiver module is configured to receive a first data packet. The processing module is configured to match first information about the first data packet with a locally or remotely stored first information base, where a service corresponding to the first information in the first information base is in a preconfigured service set. When the first information base does not include the first information about the first data packet, the processing module is further configured to send, through a first path by using the transceiver module, the first data packet to a first server corresponding to a first service, and when the processing module determines that the first service is in the preconfigured service set, the processing module is further configured to add the first information about the first data packet to the first information base, where the first service is a service corresponding to the first data packet. When the first information base includes the first information about the first data packet, the processing module is configured to send the first data packet to the first server through a second path by using the transceiver module.

With reference to the second aspect, in a possible implementation, that the processing module determines that the first service corresponding to the first data packet is in the preconfigured service set includes that the processing module is configured to determine, based on second information about the first data packet, that the first service corresponding to the first data packet is in the preconfigured service set, where the second information reflects the first service corresponding to the first data packet.

With reference to the second aspect, in a possible implementation, before the processing module sends the first data packet to the first server through the second path by using the transceiver module, the processing module is further configured to determine that the service corresponding to the first data packet is the first service. The processing module is further configured to determine the second path based on a correspondence between identification information of the first service and identification information of the second path.

With reference to the second aspect, in a possible implementation, the ONT further includes a storage module, and the correspondence between the identification information of the first service and the identification information of the second path is stored in the storage module, or the correspondence between the identification information of the first service and the identification information of the second path is stored in a cloud management platform connected to the ONT.

With reference to the second aspect, in a possible implementation, before the processing module sends the first data packet to the first server through the second path by using the transceiver module, the processing module is further configured to determine the second path based on the first information about the first data packet and a correspondence between the first information about the first data packet and identification information of the second path.

With reference to the second aspect, in a possible implementation, the ONT further includes a storage module, and the correspondence between the first information about the first data packet and the identification information of the second path is stored in the storage module, or the correspondence between the first information about the first data packet and the identification information of the second path is stored in a cloud management platform connected to the ONT.

With reference to the second aspect, in a possible implementation, the ONT further includes the storage module, the first information base is locally stored in the storage module, and before the transceiver module receives the first data packet, the transceiver module is further configured to receive the first information about the first data packet from the cloud management platform, and the processing module is further configured to store the first information about the first data packet in the first information base.

With reference to the second aspect, in a possible implementation, the first information about the first data packet includes an IP address, 5-tuple information, or service traffic characteristic information of the first data packet.

With reference to the second aspect, in a possible implementation, the second path is an overlay network tunnel.

With reference to the second aspect, in a possible implementation, the ONT further includes the storage module, and the first information base is locally stored in the storage module, or the first information base is remotely stored in the cloud management platform connected to the ONT.

With reference to the second aspect, in a possible implementation, the service set includes a value-added service or various application services provided by the Internet for users OTT service.

According to a third aspect, an ONT is provided, including a processor and a memory. The memory is configured to store computer-executable instructions, and when the ONU runs, the processor executes the computer-executable instructions stored in the memory, and the ONU is enabled to perform the data transmission method according to any one of the first aspect.

According to a fourth aspect, an ONT is provided, including a processor. The processor is configured to be coupled to a memory, and after reading instructions in the memory, perform the data transmission method according to any one of the first aspect based on the instructions.

According to a fifth aspect, a computer-readable storage medium is provided. The computer-readable storage medium stores instructions, and when the instructions are run on a computer, the computer is enabled to perform the data transmission method according to any one of the first aspect.

According to a sixth aspect, a computer program product including instructions is provided. When the computer program product runs on a computer, the computer is enabled to perform the data transmission method according to any one of the first aspect.

According to a seventh aspect, an apparatus (for example, the apparatus may be a chip system) is provided. The apparatus includes a processor, configured to support an ONT in implementing a function in the first aspect. In a possible design, the apparatus further includes a memory, and the memory is configured to store program instructions and data that are/is necessary for the ONT. When the apparatus is the chip system, the apparatus may include a chip, or may include a chip and another discrete component.

For technical effects brought by any implementation of the second aspect to the seventh aspect, refer to the technical effects brought by different implementations of the first aspect. Details are not described herein again.

DESCRIPTION OF EMBODIMENTS

Figure 1:
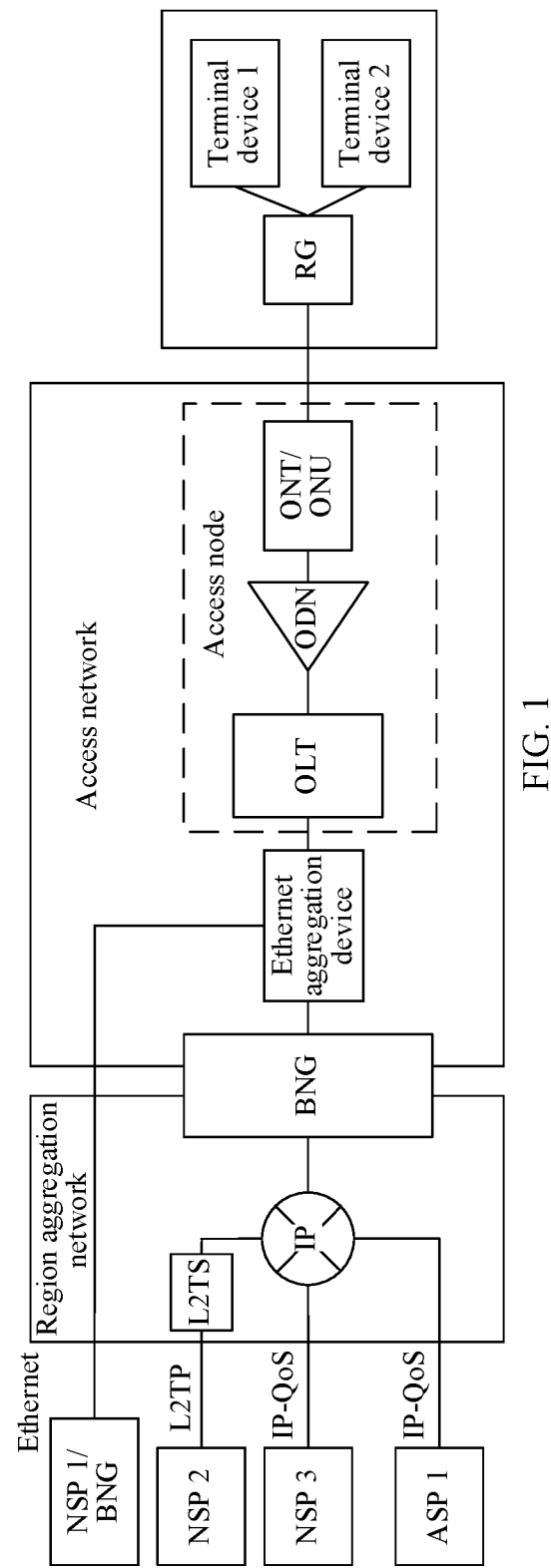
FIG. 1 is a schematic diagram of an existing broadband access fundamental architecture.

Before embodiments of this application are described in detail, to facilitate understanding of the technical solutions in embodiments of this application, the following briefly describes related technical terms in this application.

1. Ott Service:

The OTT service means that an Internet company bypasses a carrier, and develops various video and data services based on an open Internet. A typical OTT service includes an Internet television service, service cloudification, home office, cross-border education, a cross-border game, international shopping, and the like.

2. Physical Underlay Network, Overlay Network, Tunneling, and Overlay Network Tunnel:

The underlay network is an underlying network that consists of connections between different physical network devices, and is responsible for transmitting a data packet across a network. In a data center environment, a function of the underlay network is to provide an IP address connection from any physical network device (such as a server, a storage device, a router, or a switch) to any other physical network device.

The overlay network is a virtual computer network established on the underlay network. A general framework of the overlay network is to implement carrying of an application on the underlay network without performing large-scale modification on the underlay network. For example, if the underlay network includes the Internet, many peer to peer (P2P) networks are overlay networks because they are run on the Internet. The overlay network is formed by a plurality of nodes and a connection relationship between different nodes, and data is transmitted from one node to another node through a connection between different nodes. It should be noted that a node in the overlay network is not an actual physical network device, but the node in the overlay network may correspond to one physical network device in the underlay network. Similarly, the connection between the different nodes in the overlay network is also a logical concept, and is not an actual physical link. The connection may be a set of a plurality of physical links, and is a link virtualized by using a specific policy.

A tunneling technology is a manner of transferring data between networks by an Internet infrastructure. Data (or a payload) transferred through a tunnel may be data packets (or data frames) of different protocols. A data packet of another protocol is re-encapsulated by a tunneling protocol and then sent through the tunnel. A new data packet header obtained through the re-encapsulation provides routing information, to transfer encapsulated payload data through an internet. The tunneling technology can enable network services from different information sources to be transmitted through a same tunnel in a same infrastructure by using a point-to-point communication protocol.

The overlay network tunnel is a tunnel for transmitting data in the overlay network. Both a start point and an end point of the overlay network tunnel may correspond to a node in the overlay network. Therefore, the overlay network tunnel may enable data transmission to be performed directly from the start point of the overlay network tunnel to the end point of the overlay network tunnel across a physical network device, other than from one physical network device to another physical network device depending on distribution of physical network devices in the underlay network.

3. Triple-Play Service:

The triple-play service is a binding service mode that integrates voice, data, and video services. The triple-play service provides three types of services, including a high-speed Internet service, a television service (requested video and general broadcast), and a telephone service over a single broadband connection. In an existing broadband access fundamental architecture, service planning is to perform uplink quality of service (QOS) scheduling on the underlay network based on a coarse granularity of the triple-play service.

4. 5-Tuple:

The 5-tuple is a set of five elements of a data packet: a source IP address, a source port, a destination IP address, a destination port, and a transport layer protocol.

FIG. 1 is a schematic diagram of an existing broadband access fundamental architecture. As shown in FIG. 1, the existing broadband access fundamental architecture is mainly divided into three parts: a residential gateway (RG), an access network, and an aggregation network (or broadband network). An ONT or an ONU is a device that provides a network for a home user in the access network. When a terminal device of the home user requests an access service, a data packet of a service flow is transmitted from the terminal device to the ONT through the RG, and then transmitted to an Ethernet aggregation device through an optical distribution network (ODN) and an optical line terminal (OLT). Further, in a transmission manner, the data packet is transmitted from the Ethernet aggregation device to a broadband network gateway (BNG), and the BNG allocates a destination address such as an IP address of a network service provider (NSP) or an application service provider (ASP) to the data packet based on information representing a destination address of the data packet such as a destination IP address of the data packet, and transmits the data packet to the destination address based on a Layer 2 Tunneling Protocol (L2TP) through a layer 2 tunneling server (L2TS), or performs QoS (corresponding to IP-QoS in FIG. 1) scheduling based on an IP address of the data packet and transmits the data packet to the destination address. In another transmission manner, the data packet is transmitted to the destination address or the BNG through an Ethernet aggregation device private line.

With the development of communication technologies, different from a conventional triple-play service, some newly emerging services, for example OTT services such as service cloudification, home office, cross-border education, a cross-border game, and international shopping, need a carrier to ensure network quality to some extent. However, in an existing broadband access architecture, all Internet services (including the triple-play service and the OTT service) are transmitted in a same Internet service flow in a mixed manner, and share a transmission path and bandwidth. Consequently, the OTT service has no SLA assurance. Therefore, how to provide the SLA assurance for the newly emerging service is an urgent problem to be resolved currently.

In view of this, this application proposes a data transmission method, an apparatus, and a system, to resolve a problem that an existing service data transmission solution cannot provide the SLA assurance for the newly emerging service.

The following describes the technical solutions in embodiments of this application with reference to the accompanying drawings in embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: only A exists, both A and B exist, and only B exists, where A and B may be singular or plural. In addition, in the descriptions of this application, "a plurality of" means two or more than two unless otherwise specified. "At least one of the following items (pieces)" or a similar expression thereof is any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term such as "example" or "for example" is intended to present a relative concept in a specific manner for ease of understanding.

Figure 2:
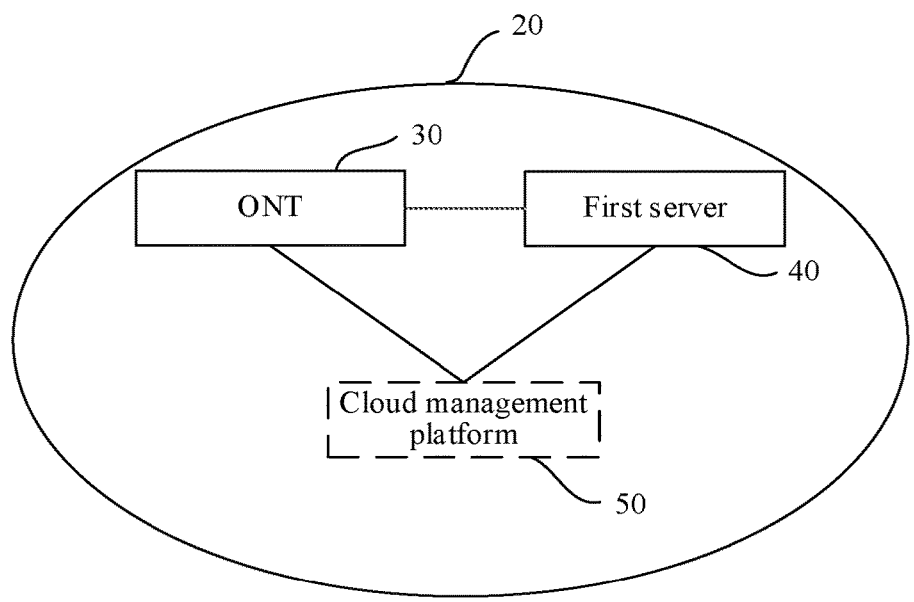
FIG. 2 is a schematic diagram of an architecture of a communication system according to an embodiment of this application.

FIG. 2 is a schematic diagram of an architecture of a communication system 20 to which a data transmission method according to an embodiment of this application is applied. As shown in FIG. 2, the communication system 20 includes an ONT 30 and a first server 40. The ONT 30 is configured to receive a first data packet. An ONT 30 is further configured to match first information about the first data packet with a locally or remotely stored first information base, where a service corresponding to the first information in the first information base is in a preconfigured service set. When the first information base does not include the first information about the first data packet, the ONT 30 sends, through a first path, the first data packet to a first server corresponding to a first service, and when the ONT 30 determines that the first service is in the preconfigured service set, the ONT 30 adds the first information about the first data packet to the first information base, where the first service is a service corresponding to the first data packet. When the first information base includes the first information about the first data packet, the ONT 30 sends the first data packet to the first server 40 through a second path. The first server 40 is configured to receive the first data packet. Specific implementation and technical effects of the solution are described in detail in subsequent method embodiments. Details are not described herein.

It should be understood that FIG. 2 is merely an example of the schematic diagram of the architecture of the communication system 20 to which a data transmission method according to an embodiment of this application is applied, and does not limit the communication system 20 to including only one ONT 30 or one first server 40. In other words, the communication system 20 may include a plurality of ONTs 30 or a plurality of first servers 40. This is uniformly described herein, and details are not described below.

Optionally, as shown in FIG. 2, the communication system 20 may further include a cloud management platform 50. The cloud management platform 50 and the ONT 30 may directly communicate with each other, or may communicate with each other through forwarding by another device. This is not limited in this embodiment of this application. The cloud management platform 50 is configured to send the first information about the first data packet to the ONT 30. The ONT 30 is configured to receive the first information about the first data packet from the cloud management platform 50, and store the first information about the first data packet in the first information base.

Optionally, a related function of the ONT 30, the first server 40, or the cloud management platform 50 in this embodiment of this application may be implemented by one device, may be jointly implemented by a plurality of devices, or may be implemented by one or more functional modules in one device. This is not limited in embodiments of this application. It may be understood that the foregoing function may be a network element in a hardware device, a software function running on dedicated hardware, a combination of hardware and software, or a virtualization function instantiated on a platform (for example, a cloud platform).

Figure 3:
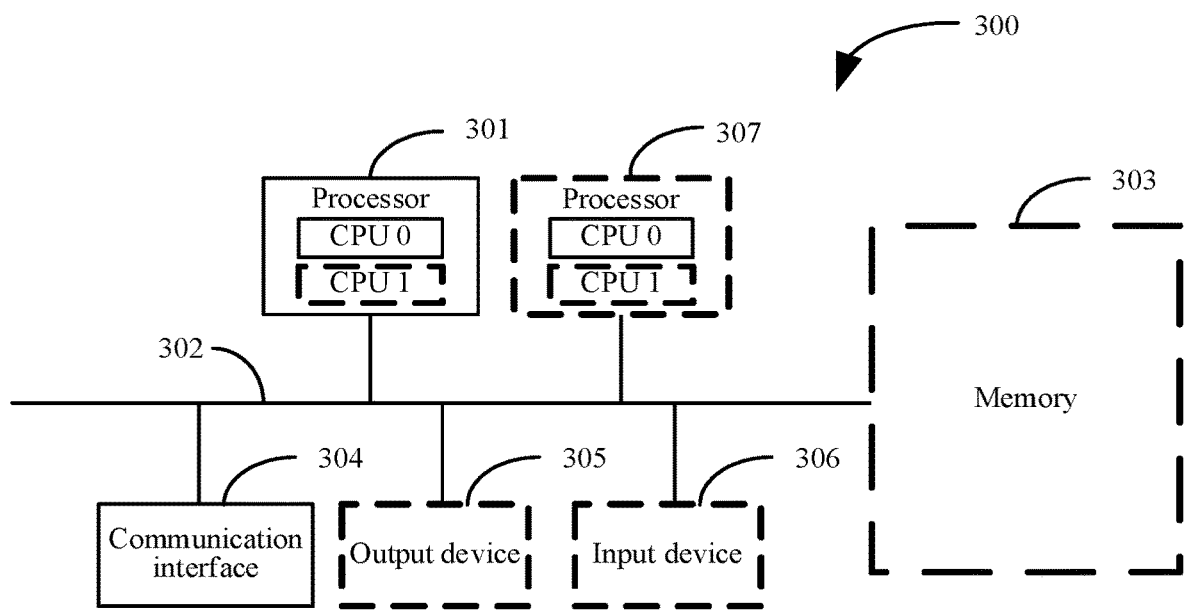
FIG. 3 is a schematic structural diagram of a communication apparatus according to an embodiment of this application.

For example, the related function of the ONT 30, the first server 40, or the cloud management platform 50 in this embodiment of this application may be implemented by using a communication apparatus 300 in FIG. 3. FIG. 3 is a schematic structural diagram of the communication apparatus 300 according to an embodiment of this application. The communication apparatus 300 includes one or more processors 301, a communication line 302, and at least one communication interface (where in FIG. 3, only an example in which a communication interface 304 and one processor 301 are included is used for description). Optionally, the communication apparatus 300 may further include a memory 303.

The processor 301 may be a general-purpose central processing unit (CPU), a microprocessor, an application-specific integrated circuit (ASIC), or one or more integrated circuits configured to control program execution of the solutions of this application.

The communication line 302 may include a path used to connect different components.

The communication interface 304 may be a transceiver module configured to communicate with another device or a communication network, for example, the Ethernet, a radio access network (RAN), or a wireless local area network (WLAN). For example, the transceiver module may be an apparatus such as a transceiver. Optionally, the communication interface 304 may alternatively be a transceiver circuit located inside the processor 301, and is configured to implement signal input and signal output of the processor.

The memory 303 may be an apparatus having a storage function. The memory may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another optical disc storage, an optical disc storage (including a compact optical disc, a laser disc, an optical disc, a DIGITAL VERSATILE DISC (DVD), a BLU-RAY disc, and the like), a magnetic disk storage medium or another magnetic storage device, or any other medium that can be used to carry or store expected program code in an instruction or data structure form and that can be accessed by a computer. However, this is not limited herein. The memory may exist independently, and is connected to the processor through the communication line 302. The memory may alternatively be integrated with the processor.

The memory 303 is configured to store computer-executable instructions for performing the solutions in this application, and the processor 301 controls execution. The processor 301 is configured to execute the computer-executable instructions stored in the memory 303, to implement a data transmission method according to embodiments of this application.

Alternatively, optionally, in this embodiment of this application, the processor 301 may perform a processing related function in the data transmission method according to the following embodiments of this application, and the communication interface 304 is responsible for communication with the other device or the communication network. This is not limited in this embodiment of this application.

Optionally, the computer-executable instructions in this embodiment of this application may also be referred to as application program code. This is not limited in this embodiment of this application.

In specific implementation, in an embodiment, the processor 301 may include one or more CPUs such as a CPU 0 and a CPU 1 in FIG. 3.

In specific implementation, in an embodiment, the communication apparatus 300 may include a plurality of processors, for example, the processor 301 and a processor 307 in FIG. 3. Each of the processors may be a single-core processor or a multi-core processor. The processor herein may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to perform an operation or processing by executing software instructions.

In specific implementation, in an embodiment, the communication apparatus 300 may further include an output device 305 and an input device 306. The output device 305 communicates with the processor 301, and may display information in a plurality of manners. For example, the output device 305 may be a liquid-crystal display (LCD), a light-emitting diode (LED) display device, a cathode-ray tube (CRT) display device, a projector, or the like. The input device 306 communicates with the processor 301, and may receive an input of a user in a plurality of manners. For example, the input device 306 may be a mouse, a keyboard, a touchscreen device, or a sensor device.

The communication apparatus 300 may also be referred to as a communication apparatus sometimes, and may be a general-purpose device or a dedicated device. For example, the communication apparatus 300 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 3. A type of the communication apparatus 300 is not limited in this embodiment of this application.

The following describes in detail the data transmission method according to embodiments of this application with reference to FIG. 1 to FIG. 3.

Figure 4:
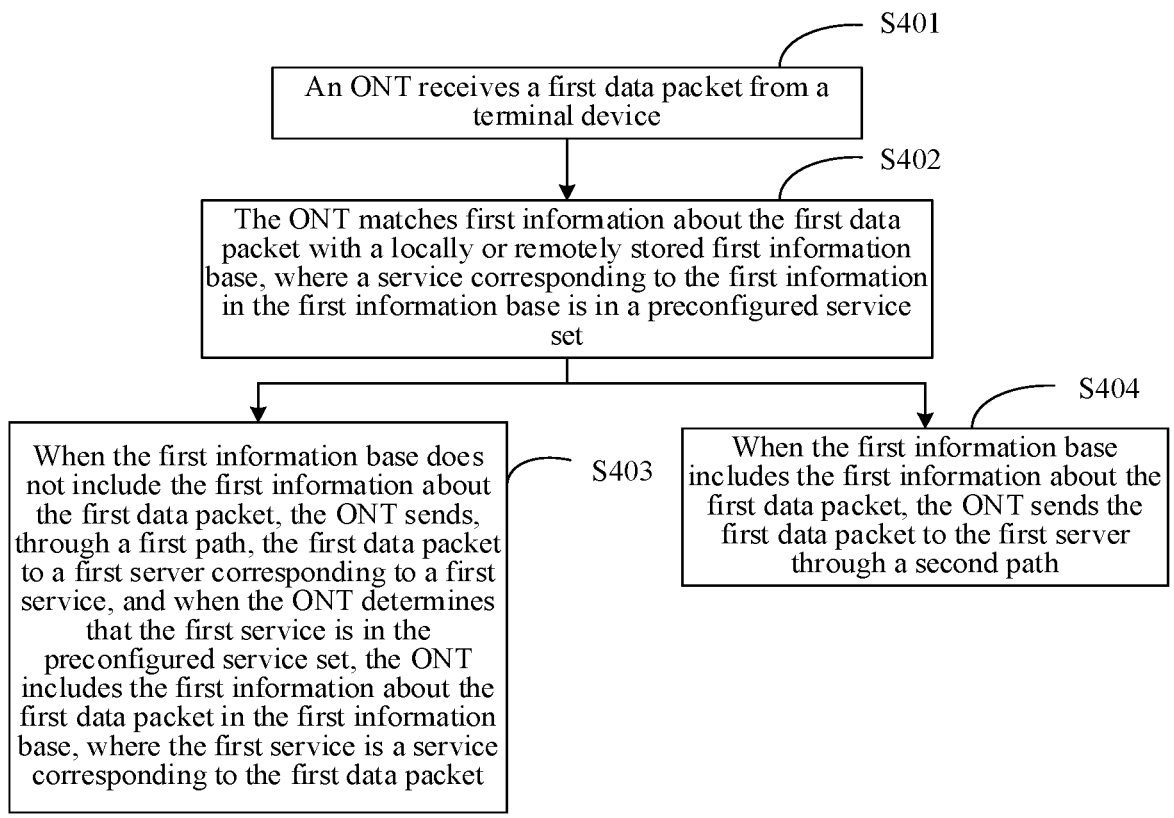
FIG. 4 is a schematic flowchart of a data transmission method according to an embodiment of this application.

FIG. 4 is a data transmission method according to an embodiment of this application. The data transmission method includes the following steps S401 to S404.

S401. An ONT receives a first data packet from a terminal device.

S402. The ONT matches first information about the first data packet with a locally or remotely stored first information base, where a service corresponding to the first information in the first information base is in a preconfigured service set.

S403. When the first information base does not include the first information about the first data packet, the ONT sends, through a first path, the first data packet to a first server corresponding to a first service, and when the ONT determines that the first service is in the preconfigured service set, the ONT adds the first information about the first data packet to the first information base, where the first service is a service corresponding to the first data packet.

S404. When the first information base includes the first information about the first data packet, the ONT sends the first data packet to the first server through a second path.

The following describes steps S401 to S404 in detail.

It should be noted that in this embodiment of this application, a first packet of a service is a 1st data packet of a service flow corresponding to the service, and a non-first packet of the service is a data packet after the 1st data packet of the service flow corresponding to the service. Unified descriptions are provided herein and details are not described below again.

It should be noted that in this embodiment of this application, the ONT may also be referred to as an ONT gateway. Unified descriptions are provided herein and details are not described below again.

For the foregoing step S401:

In this embodiment of this application, after receiving the first data packet from the terminal device, the ONT may determine the first information about the first data packet.

Optionally, in this embodiment of this application, the first information about the first data packet includes information such as a destination IP address, 5-tuple information, or service traffic characteristic information of the first data packet.

For the foregoing step S402:

In a possible implementation, the first information base may be locally stored in the ONT. In this manner, the ONT may match, by querying the local first information base, the first information about the first data packet with the first information stored in the first information base.

Alternatively, in another possible implementation, the first information base may be remotely stored in a cloud management platform connected to the ONT, and the connection is a network connection. In this manner, the ONT may query, via the cloud management platform connected to the ONT, the first information base stored in the cloud management platform, and match the first information about the first data packet with the first information stored in the first information base.

It should be noted that, in this embodiment of this application, local storage and remote storage of the first information base may coexist. For example, the ONT and the cloud management platform each store one first information base. Optionally, the ONT and the cloud management platform may update or delete, by exchanging information, the first information in the first information base stored in the ONT and the cloud management platform, to keep consistency of the first information in the first information base.

In this embodiment of this application, the first information in the first information base has a corresponding service, and the corresponding service is in the preconfigured service set. The following provides detailed descriptions.

In this embodiment of this application, there is a correspondence between the first information and the service. For a same service, there may be a plurality of service flows, and for a same service flow, first information about data packets (including the first packet and the non-first packet) is the same. First information about data packets of different service flows may be different, but corresponds to a same service. For example, first information about a data packet is a destination IP address, and a game A service has two service flows, where destination IP addresses of all data packets of a service flow 1 are an IP address of a server 1 of a game A, and destination IP addresses of all data packets of a service flow 2 are an IP address of a server 2 of the game A. Therefore, first information about a first packet and a non-first packet of the service flow 1 or the service flow 2 is the same, and first information about data packets corresponding to the service flow 1 and the service flow 2 is different, but the first information about the data packets of the service flow 1 or the service flow 2 corresponds to the game A service. In other words, in this embodiment of this application, one service may uniquely correspond to first information about one data packet, or one service may correspond to first information about a plurality of data packets. This is not limited in this embodiment of this application.

Optionally, in this embodiment of this application, a correspondence between the first information about the first data packet and the first service corresponding to the first data packet may be locally stored in the ONT or remotely stored in the cloud management platform connected to the ONT.

In this embodiment of this application, the preconfigured service set may be understood as a set of services that need to be transmitted through an independent path, or a set of services that need an SLA assurance.

It should be noted that in this embodiment of this application, a service set may be configured based on different service granularities and a user requirement. For example, a service set may be configured based on a coarse service granularity. All game services and online shopping services are configured in the preconfigured service set, and a network video service is not in the preconfigured service set. The service set may be alternatively configured based on a fine service granularity. In the game services, the game A service and a game C service are configured in the preconfigured service set, and a game B service is not configured in the preconfigured service set. This is not limited in this embodiment of this application.

Optionally, in this embodiment of this application, the preconfigured service set may include a value-added service or an OTT service. The value-added service may be understood as a service with a high service value, or a service with a high service quality requirement, for example, services such as a game and online working that require low latency, no frame freezing, and high user willingness to pay. For the OTT service, refer to the foregoing descriptions. Details are not described herein again.

Optionally, in this embodiment of this application, the preconfigured service set may be locally stored in the ONT. In this manner, the ONT may select, by querying a local service set, whether to add the first information about the first data packet to the first information base.

Alternatively, optionally, in this embodiment of this application, the preconfigured service set may be remotely stored in the cloud management platform connected to the ONT. In this manner, the ONT may query, via the cloud management platform connected to the ONT, a service set stored in the cloud management platform, to select whether to add the first information about the first data packet to the first information base.

Optionally, in this embodiment of this application, a service in the preconfigured service set may be updated or deleted based on an actual requirement.

Further, in this embodiment of this application, after the ONT matches the first information about the first data packet with the first information in the first information base, the ONT performs step S403 or step S404 based on different matching statuses.

For the foregoing step S403:

In a possible implementation, in this embodiment of this application, the first server corresponds to the first service, and a correspondence may be preconfigured. Therefore, the ONT may determine, based on first service corresponding to a data packet, the first server that receives the first data packet. For example, the ONT determines that the received first data packet corresponds to a game service, and the ONT transmits the first data packet to the first server based on a preconfigured IP address of a first server corresponding to the game service. How the ONT determines the first service corresponding to the first data packet is described below.

In another possible implementation, the ONT may determine, based on the destination IP address of the first data packet, the first server that receives the first data packet. An IP address of the first server is the same as the destination IP address of the first data packet.

Optionally, in this embodiment of this application, the first path may be a transmission path for transmitting a data packet from the ONT to the first server in an existing broadband access architecture. For example, with reference to FIG. 1, the first path is: an ONT—an OLT—an Ethernet aggregation device-a BNG-a first server in an underlay network. For a manner in which the BNG determines the first server, refer to the foregoing described manner in which the ONT determines the first server. Details are not described herein again. In this solution, based on an existing physical network architecture, a data packet is transmitted to the first server in the underlay network via many physical network devices.

In step S403, for the first data packet transmitted through the first path, if the ONT determines that the first service corresponding to the first data packet is in the preconfigured service set, the ONT adds the first information about the first data packet to the first information base. In other words, if the ONT determines that the first service corresponding to the first data packet is not in the preconfigured service set, the ONT does not add the first information about the first data packet to the first information base. Based on this solution, if the ONT receives a first packet of a service in the preconfigured service set, but first information about the first packet is not stored in the first information base before, the ONT may add the first information about the first packet to the first information base, so that the ONT can match first information about a non-first packet in the first information base when subsequently receiving the non-first packet of the service. In addition, when the first service corresponding to the first data packet is not in the preconfigured service set, the ONT does not add the first information about the first data packet to the first information base. Therefore, data of a service that is not in the preconfigured service set is transmitted through the first path.

Optionally, that the ONT determines whether the first service corresponding to the first data packet is in the preconfigured service set includes the following.

The ONT determines, based on second information about the first data packet, whether the first service corresponding to the first data packet is in the preconfigured service set, where the second information reflects the first service corresponding to the first data packet. Based on this solution, the ONT may identify, based on second information about a data packet, the first service corresponding to the first data packet, and determine whether the first service corresponding to the first data packet is in the preconfigured service set.

Optionally, in this embodiment of this application, the second information about the first data packet includes information such as the destination IP address, the 5-tuple information, or the service traffic characteristic information of the first data packet.

It should be noted that, in this embodiment of this application, the first information about the first data packet and second information about a first data packet may be same information, or may be different information. In other words, information used by the ONT to determine a transmission path of the first data packet and information used by the ONT to determine the first service corresponding to the first data packet may be same information, or may be different information. This is not limited in this embodiment of this application.

For the foregoing step S404:

It may be understood that, because the service corresponding to the first information in the first information base is in the preconfigured service set, if the ONT may match the first information about the first data packet in the first information base, or the first information base includes the first information about the first data packet, it indicates that the first service corresponding to the first data packet is in the preconfigured service set. In this case, the ONT sends the first data packet to the first server through the second path.

For how the ONT determines the first server, refer to step S403. Details are not described herein again.

It can be learned from the foregoing descriptions that, in an existing technical solution, data transmission and service scheduling are based on the underlay network, many physical network devices need to be passed through, and end-to-end (from a terminal device to a destination server) service quality cannot be ensured. Especially, when a service crosses a domain or a network, there are a larger quantity and more types of physical network devices on a transmission path of the underlay network. To ensure service quality of some specific services, a conventional technology further provides a solution: transmitting a specific service through an optical fiber private line, and not transmitting a service flow of the specific service in a mixed manner with a service flow of another service. However, costs of the optical fiber private line are high, and it is difficult to implement large-scale promotion.

Figure 5:
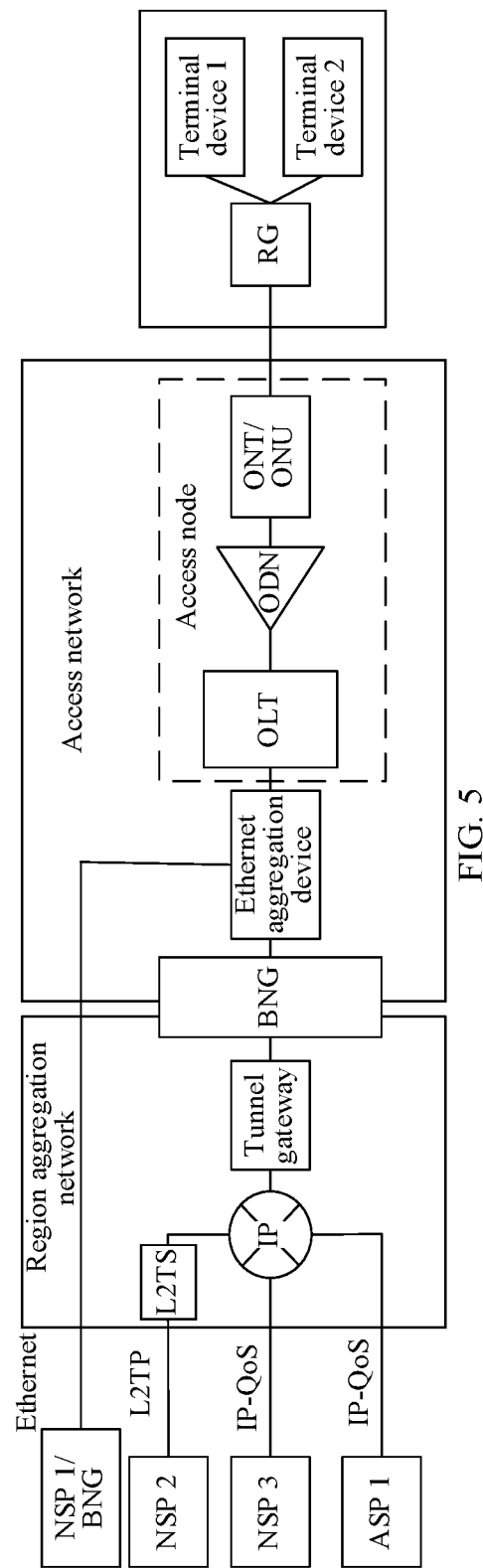
FIG. 5 is a schematic diagram of a broadband access architecture according to an embodiment of this application.

Therefore, optionally, in this embodiment of this application, the second path may be an overlay network tunnel. In this solution, a start point of the overlay network tunnel corresponds to the ONT at an underlay network layer. The first data packet starts from the start point (a node 1 of an overlay network) of the overlay network tunnel, is directly transmitted to an end point (a node 2 of the overlay network) of the overlay network tunnel at an overlay network layer through the overlay network tunnel, and is transmitted from the end point of the overlay network tunnel to the first server. For example, as shown in FIG. 5, in the underlay network, a physical network device corresponding to the end point of the overlay network tunnel may be a tunnel gateway, the tunnel gateway is connected to the BNG, and the tunnel gateway allocates a destination address to the first data packet and transmits the first data packet to the first server. For example, the tunnel gateway may be a cloud gateway. In this solution, when a data packet is transmitted, the data packet is directly transmitted from the start point of the overlay network tunnel to the end point of the overlay network tunnel, and then transmitted from the end point of the tunnel to the first server, so that point-to-point communication can be implemented without considering distribution of physical network devices of the underlay network. Therefore, compared with an existing solution in which transmission is performed based on the underlay network, this solution can ensure end-to-end service quality, and the overlay network tunnel has lower costs than optical fiber transmission, and can be replicated in a large scale.

Based on the data transmission method according to this embodiment of this application, when the first information base does not include the first information about the first data packet, the first data packet is transmitted through the first path. When the first information base includes the first information about the first data packet, the first data packet is transmitted through the second path. In addition, when the first information base does not include the first information about the first data packet, if the first service is in the preconfigured service set, the ONT adds the first information about the first data packet to the first information base. Therefore, when the ONT subsequently receives a data packet that has the same first information as the first data packet, the data packet may be transmitted to a server through the second path. In other words, for a service in the preconfigured service set, a non-first packet or a first packet whose first information is already in the first information base before the first packet is received may be transmitted through the second path. It may be understood that if the first service is not in the preconfigured service set, the ONT does not add the first information about the first data packet to the first information base. Therefore, for a service that is not in the preconfigured service set, first information about a data packet is not in the first information base, and data of the service that is not in the preconfigured service set is transmitted through the first path. Therefore, in comparison with an existing solution in which data of all services is transmitted in a mixed manner, in this solution, data of a service in a service set and data of a service outside the service set can be separately transmitted, to provide an SLA assurance for a newly emerging service.

The processor 301 in the communication apparatus 300 shown in FIG. 3 may invoke the application program code stored in the memory 303, to instruct the communication apparatus to perform actions of the ONT in steps S401 to S404. This is not limited in this embodiment. The processor 301 in the communication apparatus 300 shown in FIG. 3 may invoke the application program code stored in the memory 303, to instruct the communication apparatus to perform actions of the first server in steps S401 to S404. This is not limited in this embodiment.

Optionally, for the foregoing step S404, before the ONT sends the first data packet to the first server through the second path, in a possible implementation, the data transmission method according to this embodiment of this application further includes that the ONT determines that the service corresponding to the first data packet is the first service, and the ONT determines the second path based on a correspondence between identification information of the first service corresponding to the first data packet and identification information of the second path. For determining, by the ONT, the first service corresponding to the first data packet, refer to the foregoing descriptions of step S403, and details are not described herein again.

In other words, the second path in this solution is in a service granularity. For example, identification information of a game service is A, identification information of an online shopping service is B, and identification information of online shopping is C. There are three second paths, and identification information is 1, 2, and 3 respectively. The identification information A corresponds to the identification information 1, the identification information B corresponds to the identification information 2, and the identification information C corresponds to the identification information 3. After determining that the service corresponding to the first data packet is the game service, the ONT selects, based on the foregoing correspondence, the second path whose identification information is 1 that corresponds to the identification information A to send the first data packet. Because the second path in this solution is in the service granularity, path division based on the service granularity may be implemented during service data transmission, to further ensure an SLA ASSURANCE for a service.

Optionally, for the foregoing step S404, before the ONT sends the first data packet to the first server through the second path, in another possible implementation, the data transmission method according to this embodiment of this application further includes that the ONT determines the second path based on the first information about the first data packet and a correspondence between the first information about the first data packet and identification information of the second path.

In other words, in this solution, the second path is directly determined based on the correspondence between the first information about the first data packet and the identification information of the second path. For example, there are two second paths, and identification information is a and b respectively. The identification information a corresponds to first information 1 in first information about a data packet, and the identification information b corresponds to first information 2 in the first information about the data packet. After the ONT determines that the first information about the first data packet is the first information 1, the ONT selects, based on the correspondence, the second path whose identification information is a to send the first data packet. After the ONT determines that the first information about the first data packet is the first information 2, the ONT selects, based on the foregoing correspondence, the second path whose identification information is b to send the first data packet. Optionally, the first information 1 and the first information 2 may be first information about different data packets of a same service, or may be first information about data packets of different services. Based on this solution, when one service uniquely corresponds to first information about one data packet, path division based on the service granularity may be implemented. When one service may correspond to first information about a plurality of data packets, path division based on a granularity less than the service granularity may be implemented. Therefore, based on this solution, an SLA ASSURANCE for a service can be further ensured.

Optionally, the correspondence between the identification information of the first service and the identification information of the second path or the correspondence between the first information about the first data packet and the identification information of the second path may be stored in a form of a table or may be stored in another manner. This is not limited in this embodiment of this application.

Optionally, the correspondence between the identification information of the first service and the identification information of the second path or the correspondence between the first information about the first data packet and the identification information of the second path may be locally stored in the ONT. In this manner, the ONT may determine the second path by querying the local correspondence.

Alternatively, optionally, in this embodiment of this application, the correspondence may be remotely stored in the cloud management platform connected to the ONT. In this manner, the ONT may query, via the cloud management platform connected to the ONT, the correspondence stored in the cloud management platform to determine the second path.

Optionally, when the first information base is locally stored in the ONT, the first data packet is received at the ONT. The data transmission method according to this embodiment of this application further includes that the ONT receives the first information about the first data packet from the cloud management platform, and stores the received first information about the first data packet in the first information base.

In this solution, the cloud management platform may send the first information about the first data packet to the ONT, so that the ONT receives the first information about the first data packet, and synchronously updates the first information base stored locally in the ONT. Optionally, the first information sent by the cloud management platform may be from another ONT. For example, a first ONT receives the first data packet and obtains the first information about the first data packet. After the first ONT determines that a first information base locally stored in the first ONT does not include the first information about the first data packet, the first ONT adds the first information about the first data packet to the local first information base of the first ONT, and transmits the first information about the first data packet to the cloud management platform. After receiving the first information about the first data packet, the cloud management platform broadcasts the first information about the first data packet to the another ONT connected to the cloud management platform. After receiving the first information about the first data packet from the cloud management platform, the another ONT stores the first information in a local first information base of the other ONT. Further, after subsequently receiving a data packet (or a data packet of the first service) that has the same first information as the first data packet, the another ONT may match the first information about the data packet of the first service in the local first information base of the another ONT, and transmit, through the second path, the data packet of the first service to the first server corresponding to the first service. Optionally, in this solution, the cloud management platform may also store the first information base. In other words, in the foregoing example, when the first ONT sends the first information about the first data packet to the cloud management platform, the cloud management platform may add the received first information about the first data packet to the first information base stored in the cloud management platform, and broadcast the first information about the first data packet to the other ONT.

Based on this solution, first information in first information bases of all ONTs connected to the cloud management platform may be synchronously updated via the cloud management platform. Further, when an ONT receives a first packet of a service in the preconfigured service set, but first information about the first packet is not stored in the first information base before, through synchronous update via the cloud management platform, if a remaining ONT subsequently receives a data packet of the service, the data packet may be directly transmitted through the second path. This saves time and resources for the remaining ONT to identify a data packet service.

Figure 6:
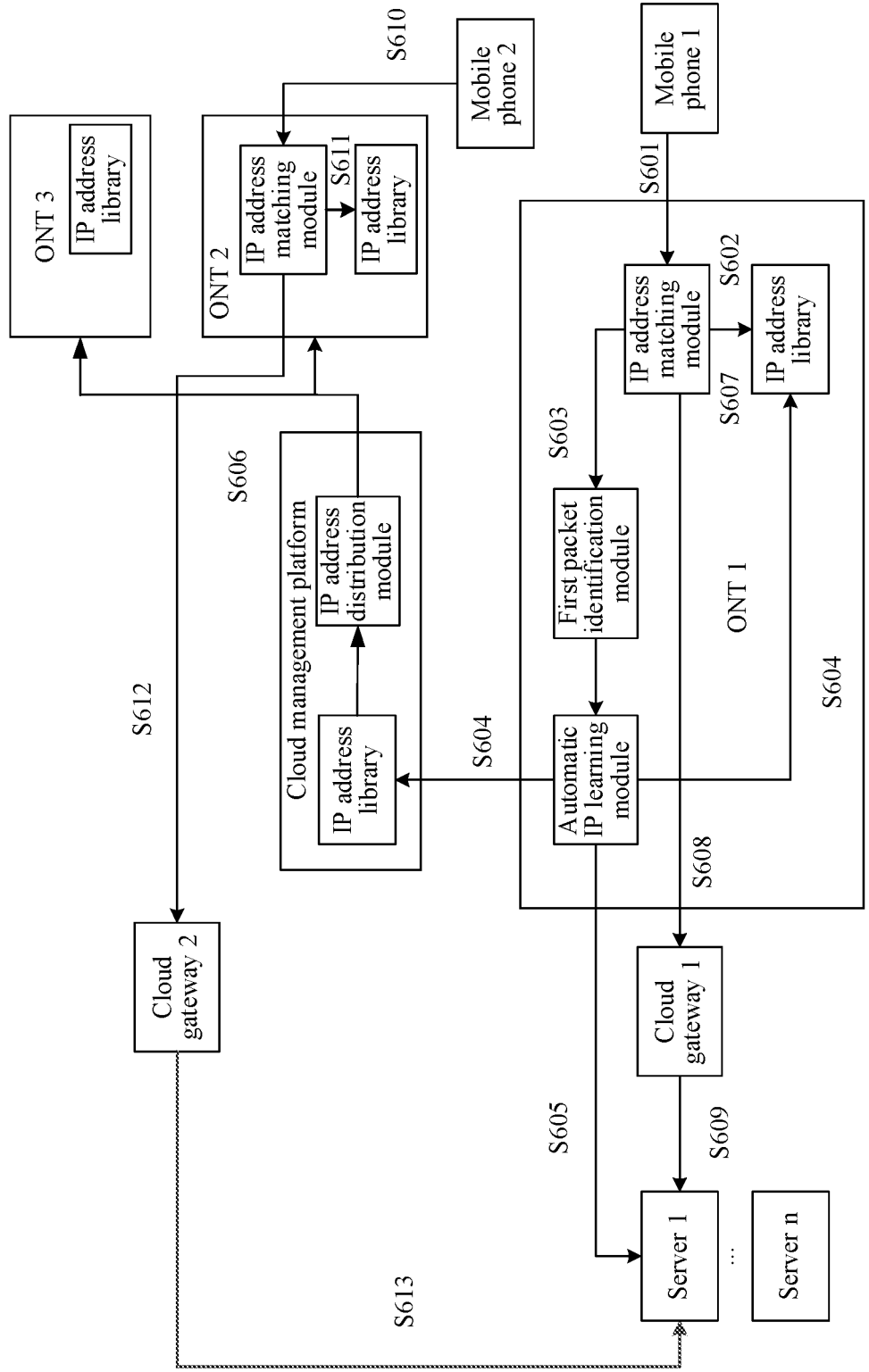
FIG. 6 is a schematic flowchart of a specific example according to an embodiment of this application.

For ease of understanding, the following describes the data transmission method according to this embodiment of this application with reference to a specific example. In this example, it is assumed that a terminal device is a mobile phone, first information about a data packet is a destination IP address of the data packet, and second information about the data packet is service traffic characteristic information. FIG. 6 is a schematic flowchart of the example, including the following steps.

S601. A user A plays a game A on a mobile phone 1, and the mobile phone 1 sends a first packet, namely, a data packet 1, of a service flow of the game A and a non-first packet, namely, a data packet 2, after the data packet 1 to an ONT 1.

S602. After the ONT 1 receives the data packet 1, an IP address matching module in the ONT 1 matches a destination IP address of the data packet 1 with an IP address in a local IP address library of the ONT 1.

Because the ONT 1 has not accessed the service flow of the game A before, the IP address library does not include the destination IP address of the data packet 1. Therefore, the IP address matching module in the ONT 1 cannot match the destination IP address of the data packet 1 in the local IP address library, or in other words, a first information base in the ONT 1 does not include first information about the data packet 1.

S603. The IP address matching module in the ONT 1 transmits the data packet 1 to a first packet identification module in the ONT 1, and the first packet identification module in the ONT 1 identifies, based on service traffic characteristic information of the data packet 1, that a service corresponding to the data packet 1 is a game A service. It is assumed that the game A service is a service in a preconfigured service set, the data packet 1 is transmitted to an automatic IP learning module in the ONT 1.

S604. The automatic IP learning module in the ONT 1 learns that the destination IP address of the data packet 1 is first information corresponding to the game A service in the preconfigured service set, and the automatic IP learning module adds the destination IP address of the data packet 1 to the local IP address library of the ONT 1. In addition, the automatic IP learning module in the ONT 1 further reports the destination IP address of the data packet 1 to a cloud management platform. The cloud management platform stores, in an IP address library in the cloud management platform, the destination IP address of the data packet 1 received from the ONT 1.

S605. The automatic IP learning module in the ONT 1 sends the data packet 1 to a server 1 of the game A service through a first path based on the destination IP address of the data packet 1, where an IP address of the server 1 is the same as the destination IP address of the data packet 1. For related descriptions of the first path, refer to the embodiment shown in FIG. 4. Details are not described herein again.

S606. An IP address distribution module of the cloud management platform broadcasts the destination IP address of the data packet 1 to another ONT (for example, an ONT 2 and an ONT 3 in the figure) connected to the cloud management platform. After receiving the destination IP address of the data packet 1, the another ONT connected to the cloud management platform stores the destination IP address of the data packet 1 in a local IP address library.

S607. After the ONT 1 receives a data packet 2, the IP address matching module in the ONT 1 matches a destination IP address of the data packet 2 with an IP address in the local IP address library of the ONT 1.

In the foregoing step S604, the automatic IP learning module in the ONT 1 adds the destination IP address of the data packet 1 to the local IP address library, and the destination IP address of the data packet 1 is the same as the destination IP address of the data packet 2. Therefore, the IP address matching module in the ONT 1 may match the destination IP address of the data packet 2 in the local IP address library, or in other words, the first information base in the ONT 1 includes first information about the data packet 2.

S608. The IP address matching module in the ONT 1 transmits the data packet 2 to a cloud gateway 1 at an overlay network layer through a configured home private line tunnel 1. The home private line tunnel 1 is an overlay network tunnel.

S609. The cloud gateway transmits the data packet 2 to the server 1 of the game A service based on the destination IP address of the data packet 2.

S610. A user B plays the game A on a mobile phone 2, and the mobile phone 2 sends a first packet, namely, a data packet 3, of a service flow of the game A to the ONT 2. A destination IP address of the data packet 3 is the same as the destination IP address of the data packet 1, and both are the server 1.

S611. After the ONT 2 receives the data packet 3, an IP address matching module in the ONT 2 matches the destination IP address of the data packet 3 with an IP address in a local IP address library of the ONT 3.

In the foregoing step S606, the ONT 2 receives the destination IP address of the data packet 1 from the cloud management platform and stores the destination IP address in the local IP address library of the ONT 2. Therefore, the IP address matching module in the ONT 2 may match the destination IP address of the data packet 3 in the local IP address library, or in other words, a first information base in the ONT 2 includes first information about the data packet 3.

S612. The IP address matching module in the ONT 2 transmits the data packet 3 to a cloud gateway 2 at the overlay network layer through a configured home private line tunnel 2. The home private line tunnel 2 is an overlay network tunnel.

S613. The cloud gateway 2 transmits the data packet 3 to the server 1 of the game A service based on the destination IP address of the data packet 3.

It may be understood that, in the foregoing embodiments, the method and/or the step implemented by the ONT may also be implemented by a component (for example, a chip or a circuit) that can be used in the ONT, the method and/or the step implemented by the cloud management platform may also be implemented by a component (for example, a chip or a circuit) that can be used in the cloud management platform, and the method and/or the step implemented by the first server may also be implemented by a component (for example, a chip or a circuit) that can be used in the first server.

The foregoing mainly describes, from a perspective of interaction between devices, the solutions provided in embodiments of this application. Correspondingly, an embodiment of this application further provides a communication apparatus, and the communication apparatus is configured to implement the foregoing methods. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 7:
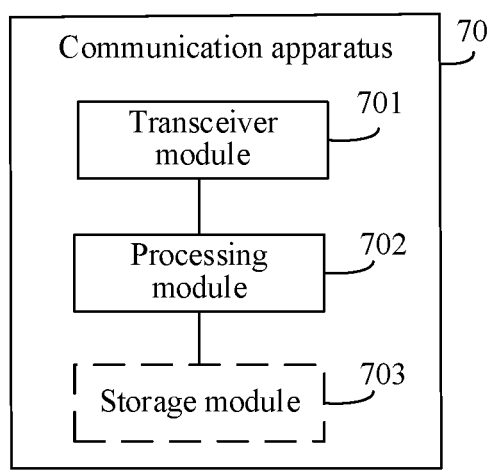
FIG. 7 is a schematic structural diagram of another communication apparatus according to an embodiment of this application.

FIG. 7 is a schematic structural diagram of a communication apparatus 70. The communication apparatus 70 includes a transceiver module 701 and a processing module 702. The transceiver module 701 may also be referred to as a transceiver unit, and is configured to implement a transceiver function. For example, the transceiver module 701 may be a transceiver circuit, a transceiver, or a communication interface. For example, the communication apparatus 70 is the ONT in the foregoing method embodiments, and the transceiver module 701 is configured to receive a first data packet. The processing module 702 is configured to match first information about the first data packet with a locally or remotely stored first information base, where a service corresponding to the first information in the first information base is in a preconfigured service set.

When the first information base does not include the first information about the first data packet, the processing module 702 is further configured to send, through a first path by using the transceiver module 701, the first data packet to a first server corresponding to a first service, and when the processing module 702 determines that the first service is in the preconfigured service set, the processing module 702 is further configured to add the first information about the first data packet to the first information base, where the first service is a service corresponding to the first data packet. When the first information base includes the first information about the first data packet, the processing module 702 is configured to send the first data packet to the first server through a second path by using the transceiver module 701.

Optionally, that the processing module 702 determines that the first service is in the preconfigured service set includes that the processing module 702 is configured to determine, based on second information about the first data packet, that the first service corresponding to the first data packet is in the preconfigured service set, where the second information reflects the first service corresponding to the first data packet.

Optionally, before the processing module 702 sends the first data packet to the first server through the second path by using the transceiver module, the processing module 702 is further configured to determine that the service corresponding to the first data packet is the first service, and the processing module 702 is further configured to determine the second path based on a correspondence between identification information of the first service and identification information of the second path.

As shown in FIG. 7, optionally, the ONT further includes a storage module 703, and the correspondence between the identification information of the first service and the identification information of the second path is stored in the storage module 703, or the correspondence between the identification information of the first service and the identification information of the second path is stored in a cloud management platform connected to the ONT.

Optionally, before the processing module 702 sends the first data packet to the first server through the second path by using the transceiver module 701, the processing module 702 is further configured to determine the second path based on the first information about the first data packet and a correspondence between the first information about the first data packet and identification information of the second path.

As shown in FIG. 7, optionally, the ONT further includes a storage module 703, and the correspondence between the first information about the first data packet and the identification information of the second path is stored in the storage module 703, or the correspondence between the first information about the first data packet and the identification information of the second path is stored in a cloud management platform connected to the ONT.

As shown in FIG. 7, optionally, the ONT further includes the storage module 703, the first information base is locally stored in the storage module 703, and before the transceiver module 701 receives the first data packet, the transceiver module 701 is further configured to receive the first information about the first data packet from the cloud management platform, and the processing module 702 is further configured to store the first information about the first data packet in the first information base.

Optionally, the first information about the first data packet includes an IP address, 5-tuple information, or service traffic characteristic information of the first data packet.

Optionally, the second path is an overlay network tunnel.

As shown in FIG. 7, optionally, the ONT further includes the storage module 703, and the first information base is locally stored in the storage module 703, or the first information base is remotely stored in the cloud management platform connected to the ONT.

Optionally, the service set includes a value-added service or various application services provided by the Internet for users OTT service.

All related content of the steps in the foregoing method embodiments may be cited in function descriptions of the corresponding functional modules. Details are not described herein again.

In this embodiment, the communication apparatus 70 is presented in a form of functional modules obtained through division in an integrated manner. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the communication apparatus 70 may be in a form of the communication apparatus 300 shown in FIG. 3.

For example, the processor 301 in the communication apparatus 300 shown in FIG. 3 may invoke the computer-executable instructions stored in the memory 303, to enable the communication apparatus 300 to perform the data transmission method in the foregoing method embodiments.

Further, functions/implementation processes of the transceiver module 701 and the processing module 702 in FIG. 7 may be implemented by the processor 301 in the communication apparatus 300 shown in FIG. 3 by invoking the computer-executable instructions stored in the memory 303. Alternatively, a function/an implementation process of the processing module 702 in FIG. 7 may be implemented by the processor 301 in the communication apparatus 300 shown in FIG. 3 by invoking the computer-executable instructions stored in the memory 303, and a function/an implementation process of the transceiver module 701 in FIG. 7 may be implemented through the communication interface 304 in the communication apparatus 300 shown in FIG. 3.

The communication apparatus 70 provided in this embodiment may perform the foregoing data transmission method. Therefore, for technical effects that can be achieved by the communication apparatus 70, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a system-on-a-chip (SoC) or an ASIC, or may be an independent semiconductor chip. In addition to a core used to execute software instructions to perform an operation or processing, the processor may further include a necessary hardware accelerator, such as a field-programmable gate array (FPGA), a programmable logic device (PLD), or a logic circuit implementing a dedicated logical operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system. The chip system includes at least one processor and an interface. The at least one processor is coupled to a memory through the interface. When the at least one processor executes a computer program or instructions in the memory, the method according to any one of the foregoing method embodiments is performed. In a possible implementation, the communication apparatus further includes the memory. Optionally, the chip system may include a chip, or may include a chip and another discrete component. This is not limited in embodiments of this application.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies of this application.

What is claimed is:

1. A data transmission method, wherein the method comprises:
    receiving, by an optical network terminal (ONT), a first data packet;
    matching, by the ONT, first information about the first data packet with a first information base, wherein a second service corresponding to the first information in the first information base is in a preconfigured service set;
    when the first information base does not comprise the first information;
        sending, by the ONT through a first path, the first data packet to a first server corresponding to a first service, wherein the first service corresponds to the first data packet; and
        adding, by the ONT, the first information to the first information base when the first service is in the preconfigured service set; and
    sending, by the ONT, the first data packet to the first server through a second path when the first information base comprises the first information.

2. The method of claim 1, further comprising determining, by the ONT and based on second information about the first data packet, that the first service is in the preconfigured service set, wherein the second information reflects the first service.

3. The method of claim 1, wherein before sending the first data packet to the first server through the second path, the method further comprises:
    determining, by the ONT, that the first service corresponds to the first data packet; and
    determining, by the ONT and based on a correspondence between first identification information of the first service and second identification information of the second path, the second path.

4. The method of claim 3, further comprising storing, by the ONT, the correspondence in the ONT or a cloud management platform.

5. The method of claim 1, wherein before sending, by the ONT, the first data packet to the first server through the second path, the method further comprises determining, by the ONT, the second path based on the first information and a correspondence between the first information and identification information of the second path.

6. The method of claim 5, further comprising storing, by the ONT, the correspondence is stored in the ONT or in a cloud management platform.

7. The method of claim 1, further comprising locally storing, by the ONT, the first information base in the ONT, and wherein before receiving the first data packet, the method further comprises:
    receiving, by the ONT, from a cloud management platform, the first information; and storing, by the ONT, the first information in the first information base.

8. The method of claim 1, wherein the first information comprises an Internet Protocol (IP) address of the first data packet.

9. The method of claim 1, wherein the second path is an overlay network tunnel.

10. The method of claim 1, further comprising locally storing, by the ONT, the first information base in the ONT.

11. The method of claim 1, wherein the preconfigured service set comprises a value-added service.

12. An optical network terminal (ONT) comprising:
 a memory configured to store computer-executable instructions; and
 one or more processors coupled to the memory and configured to execute the computer-executable instructions to cause the ONT:
  receive a first data packet;
  match first information about the first data packet with a first information base, wherein a second service corresponding to the first information in the first information base is in a preconfigured service set;
  when the first information base does not comprise the first information;
  send, through a first path, the first data packet to a first server corresponding to a first service, wherein the first service corresponds to the first data packet; and
  add, to the first information base, the first information when the first service is in the preconfigured service set; and
  send, to the first server through a second path, the first data packet when the first information base comprises the first information.

13. A computer program product comprising computer-executable instructions that are stored on a non-transitory computer-readable storage medium of an optical network terminal (ONT) and that, when executed by a processor, cause a computer to:
 receive a first data packet;
 match first information about the first data packet with a first information base, wherein a second service corresponding to the first information in the first information base is in a preconfigured service set;
 when the first information base does not comprise the first information;
 send, through a first path, the first data packet to a first server corresponding to a first service, wherein the first service corresponds to the first data packet; and
 add, to the first information base, the first information when the first service is in the preconfigured service set; and
 send, to the first server through a second path, the first data packet when the first information base comprises the first information.

14. The computer program product of claim 13, wherein the computer-executable instructions further cause the computer to determine, based on second information about the first data packet, that the first service is in the preconfigured service set, and wherein the second information reflects the first service.

15. The computer program product of claim 13, wherein the computer-executable instructions further cause the computer to:
 determine that the first service corresponds to the first data packet; and
 determine, based on a correspondence between first identification information of the first service and second identification information of the second path, the second path.

16. The computer program product of claim 13, wherein before sending the first data packet to the first server through the second path, the computer-executable instructions further cause the computer to determine the second path based on the first information and a correspondence between the first information and identification information of the second path.

17. The computer program product of claim 13, wherein the computer-executable instructions further cause the computer to:
 locally store the first information base in the ONT;
 receive, from a cloud management platform, the first information; and
 store the first information in the first information base.

18. The method of claim 1, wherein the first information comprises 5-tuple information of the first data packet.

19. The method of claim 1, wherein the first information comprises service traffic characteristic information of the first data packet.

20. The method of claim 1, wherein the preconfigured service set comprises various application services provided by an Internet for users over-the-top (OTT) service.

* * * * *

UNITED STATES PATENT AND TRADEMARK OFFICE
CERTIFICATE OF CORRECTION

| | | |
|---|---|---|
| PATENT NO. | : 12,513,437 B2 | Page 1 of 1 |
| APPLICATION NO. | : 18/496217 | |
| DATED | : December 30, 2025 | |
| INVENTOR(S) | : Yiming Wang, Wenming Wang and Yong Luo | |

It is certified that error appears in the above-identified patent and that said Letters Patent is hereby corrected as shown below:

In the Claims

Claim 6, Column 24, Line 60: "correspondence is stored in the ONT" should read correspondence in the ONT Signed and Sealed this
Twenty-seventh Day of January, 2026

John A. Squires
*Director of the United States Patent and Trademark Office*